US011955928B1

(12) United States Patent
Chang

(10) Patent No.: US 11,955,928 B1
(45) Date of Patent: Apr. 9, 2024

(54) SOLAR POWER GENERATING SYSTEM

(71) Applicant: Season Energy Technology Co., Ltd., Tainan (TW)

(72) Inventor: Lin-Hung Chang, Tainan (TW)

(73) Assignee: SEASON ENERGY TECHNOLOGY CO., LTD., Tainan (TW)

( * ) Notice: Subject to any disclaimer, the term of this patent is extended or adjusted under 35 U.S.C. 154(b) by 0 days.

(21) Appl. No.: 17/986,042

(22) Filed: Nov. 14, 2022

(51) Int. Cl.
*H02S 40/10* (2014.01)
*H02J 7/35* (2006.01)
*H02S 40/42* (2014.01)
*H02S 40/44* (2014.01)

(52) U.S. Cl.
CPC ............... *H02S 40/10* (2014.12); *H02J 7/35* (2013.01); *H02S 40/425* (2014.12); *H02S 40/44* (2014.12); *H02J 2300/24* (2020.01)

(58) Field of Classification Search
CPC ........ H02S 40/10; H02S 40/425; H02S 40/44; H02J 7/35; H02J 2300/24
See application file for complete search history.

(56) References Cited

U.S. PATENT DOCUMENTS

2014/0375343 A1* 12/2014 Chen ................... H02S 40/10
324/750.02
2016/0065127 A1* 3/2016 Newdoll ................ H02S 40/10
136/246

FOREIGN PATENT DOCUMENTS

| KR | 1340039 B1 | * | 12/2013 | |
|----|------------|---|---------|------|
| KR | 2014011452 A | * | 1/2014 | |
| KR | 2018039296 A | * | 4/2018 | ............. B08B 11/00 |
| KR | 2020104056 A | * | 9/2020 | ............. B08B 3/024 |
| KR | 2022061531 A | * | 5/2022 | |

OTHER PUBLICATIONS

KR-2020104056-A English machine translation (Year: 2020).*
KR-2018039296-A English machine translation (Year: 2018).*
KR-2022061531-A English machine translation (Year: 2022).*
KR-1340039-B1 English machine translation (Year: 2013).*
KR-2014011452-A English machine translation (Year: 2014).*

* cited by examiner

*Primary Examiner* — Andrew J Golden
(74) *Attorney, Agent, or Firm* — Che-Yang Chen; Law Office of Michael Chen

(57) ABSTRACT

A solar power generating system includes a solar power generating device (10), a microbubble cleaning device (20) mounted on the solar power generating device, a temperature adjustment device (30) mounted on the solar power generating device, and a controller (40) electrically connected with the solar power generating device, the microbubble cleaning device, and the temperature adjustment device. The microbubble cleaning device produces a liquid containing microbubbles and is controlled by the controller to inject the liquid outward to clean a surface of the solar power generating device. The temperature adjustment device is used to regulate an ambient temperature of the solar power generating device. The controller receives data of power generation from the solar power generating device, and controls on/off operation of the microbubble cleaning device and the temperature adjustment device.

13 Claims, 4 Drawing Sheets

US 11,955,928 B1

SOLAR POWER GENERATING SYSTEM

BACKGROUND OF THE INVENTION

1. Field of the Invention

The present invention relates to a generating system and, more particularly, to a solar power generating system.

2. Description of the Related Art

A solar panel is used to collect the sunlight, and then convert the solar energy into an electric power by a photoelectric conversion. Then, the electric power is delivered into and stored by a battery for use in the future. The solar panel is usually arranged on an open place to receive irradiation of the sunlight. However, foreign dirt (such oil pollution, bird excrement or leaf sap) easily accumulates on and shades the solar panel, thereby decreasing the power generating efficiency, and thereby eroding or failing the solar panel. In addition, the solar panel is cleaned by a manual labor during a period, thereby wasting the time and the labor's work. Further, the solar panel cannot be cleaned exactly when the foreign substance is stuck to the solar panel, thereby decreasing the power generating efficiency. Further, the ambient temperature of the solar panel cannot be controlled, thereby affecting the working temperature of the solar panel, and thereby decreasing the power generating efficiency.

BRIEF SUMMARY OF THE INVENTION

The primary objective of the present invention is to provide a solar power generating system that enhances the power generating efficiency and increases the lifetime.

In accordance with the present invention, there is provided a solar power generating system comprising a solar power generating device, a microbubble cleaning device mounted on the solar power generating device, a temperature adjustment device mounted on the solar power generating device, and a controller electrically connected with the solar power generating device, the microbubble cleaning device, and the temperature adjustment device. The microbubble cleaning device produces a liquid containing microbubbles of a micrometer level. The microbubble cleaning device is controlled by the controller to inject the liquid outward to clean a surface of the solar power generating device. The temperature adjustment device is used to regulate an ambient temperature of the solar power generating device. The controller receives data of power generation from the solar power generating device, and controls on/off operation of the microbubble cleaning device and the temperature adjustment device.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
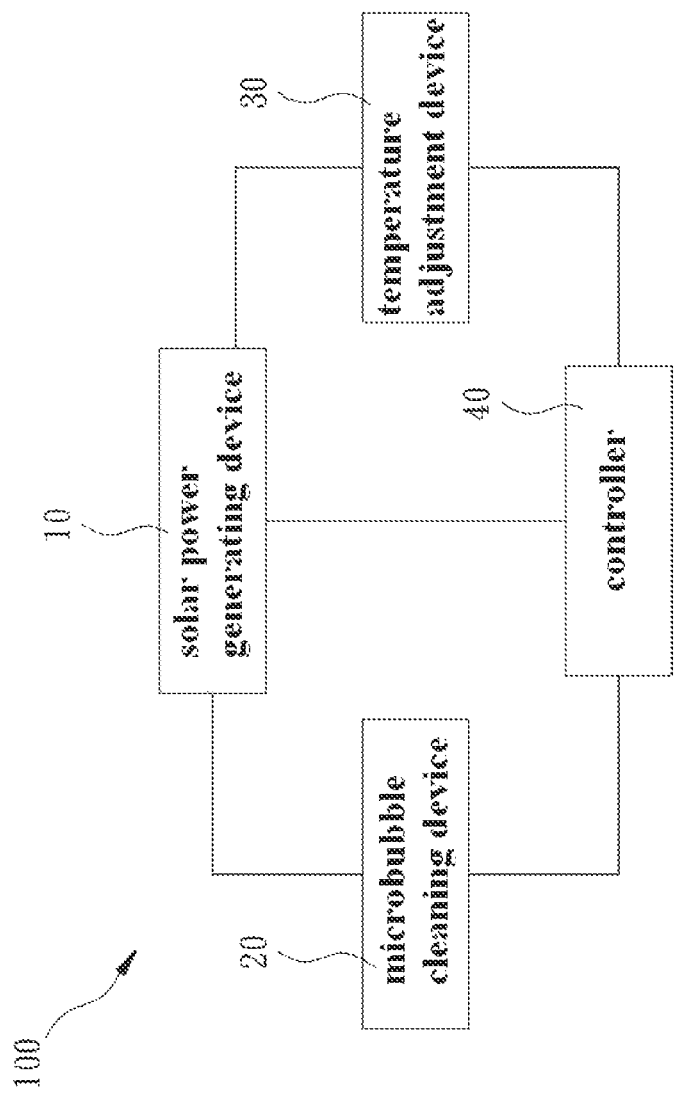
FIG. 1 is a block diagram of a solar power generating system in accordance with the first preferred embodiment of the present invention.
Figure 2:
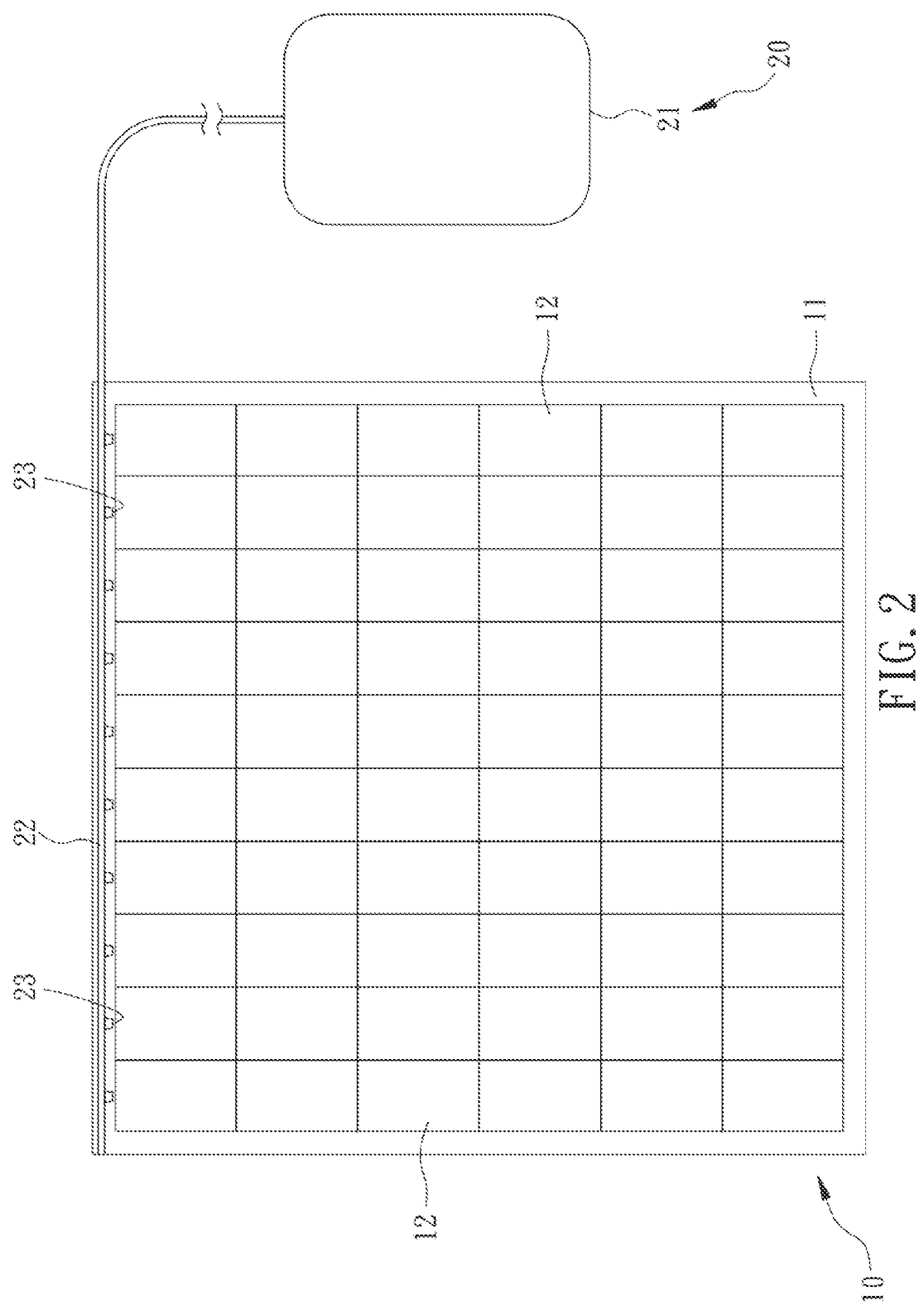
FIG. 2 is a schematic view of a microbubble cleaning device of the solar power generating system in accordance with the preferred embodiment of the present invention.
Figure 3:
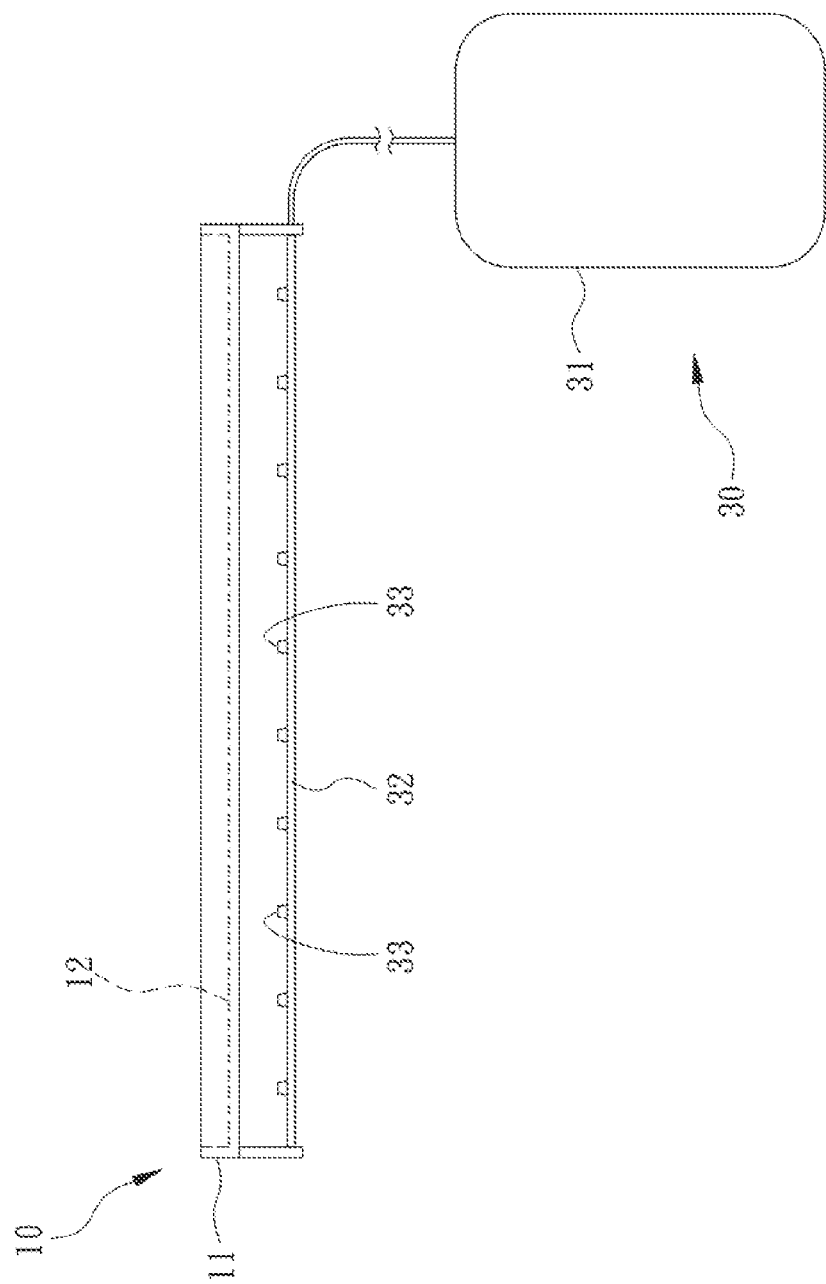
FIG. 3 is a schematic view of a temperature adjustment device of the solar power generating system in accordance with the preferred embodiment of the present invention.

Referring to the drawings and initially to FIGS. 1-3, a solar power generating system 100 in accordance with the preferred embodiment of the present invention comprises a solar power generating device 10, a microbubble cleaning device 20 mounted on the solar power generating device 10, a temperature adjustment device 30 mounted on the solar power generating device 10, and a controller 40 electrically connected with the solar power generating device 10, the microbubble cleaning device 20, and the temperature adjustment device 30.

The solar power generating device 10 converts a solar energy into an electric energy. The microbubble cleaning device 20 produces a liquid containing microbubbles of a micrometer level. The microbubble cleaning device 20 is controlled by the controller 40 to inject the liquid outward to clean a surface of the solar power generating device 10. The temperature adjustment device 30 is used to regulate an ambient temperature of the solar power generating device 10. The controller 40 receives data of power generation from the solar power generating device 10, and controls on/off operation of the microbubble cleaning device 20 and the temperature adjustment device 30.

In the preferred embodiment of the present invention, the solar power generating device 10 includes at least one support member 11 and multiple solar panels 12 mounted on the at least one support member 11. The at least one support member 11 is a rack or a column for placing the solar panels 12. The solar panels 12 collects sunlight, converts a solar power of the sunlight into an electric power by a photoelectric conversion, and outputs the electric power. The controller 40 is electrically connected with the solar panels 12. The microbubble cleaning device 20 is used to clean a surface of the solar panels 12, and to reduce the temperature of the solar panels 12 during the cleaning process. The temperature adjustment device 30 is used to regulate a temperature of the solar panels 12.

In the preferred embodiment of the present invention, the controller detects and monitors the data of power generation from the solar power generating device 10, including a temperature, an electric current, a voltage, and a generating power.

In the preferred embodiment of the present invention, the microbubble cleaning device 20 includes at least one generator 21, at least one cleaning pipe 22, and multiple cleaning nozzles 23. The at least one generator 21 generates an evenly mixed liquid containing hydrogen microbubbles and oxygen microbubbles of a micrometer level. The at least one cleaning pipe 22 is secured to the at least one support member 11 of the solar power generating device 10 and connected to the at least one generator 21. The cleaning nozzles 23 are mounted on the at least one cleaning pipe 22 and directed toward the surface of the solar panels 12 of the solar power generating device 10.

In the preferred embodiment of the present invention, the temperature adjustment device 30 is mounted on the at least one support member 11 and located under the solar panels 12, to change the ambient temperature of the solar panels 12, and to regulate the working temperature of the solar panels 12. Preferably, the temperature adjustment device 30 includes a storage container 31 and at least one guide pipe 32. The storage container 31 contains a cooling medium (such as water) or a heating medium (such as vapor or hot oil) therein. The at least one guide pipe 32 is secured to the solar power generating device 10 and connected to the storage container 31 to circulate the cooling medium or the heating medium. Preferably, the at least one guide pipe 32 is secured to the at least one support member 11 and located under the solar panels 12.

In the preferred embodiment of the present invention, the temperature adjustment device 30 further includes multiple spraying nozzles 33 mounted on the at least one guide pipe 32 and directed toward the solar panels 12 of the solar power generating device 10.

In the preferred embodiment of the present invention, the controller presets condition parameters and identifies the data from the solar power generating device 10, to control the on/off operation of the microbubble cleaning device 20 and the temperature adjustment device 30 according to the preset condition parameters.

In another preferred embodiment of the present invention, the controller 40 is driven by an operator to manually control the on/off operation of the microbubble cleaning device 20 and the temperature adjustment device 30.

In the preferred embodiment of the present invention, the microbubble cleaning device 20 and the temperature adjustment device 30 are controlled by the controller 40 and operated individually or simultaneously.

Thus, when the microbubble cleaning device 20 and the temperature adjustment device 30 are operated simultaneously, the temperature of the solar panels 12 is decreased quickly and efficiently.

In practice, the controller 40 sets the condition parameters to enter an auto-control mode. For example, when the ambient temperature of the solar power generating device 10 exceeds a preset value, such as 25° C., the controller 40 starts the temperature adjustment device 30. Thus, water (or cooling medium) in the storage container 31 is delivered through the at least one guide pipe 32 to the spraying nozzles 33 which sprays the water to decrease the temperature of the solar panels 12 and to enhance the working efficiency of the solar panels 12. Alternatively, vapor (or heating medium) in the storage container 31 is used to increase the temperature of the solar panels 12 in the winter.

In addition, when the solar panels 12 are shaded, the controller 40 starts the microbubble cleaning device 20. Thus, the liquid of the at least one generator 21 is delivered through the at least one cleaning pipe 22 to the cleaning nozzles 23 which sprays the liquid to clean the surface of the solar panels 12. The liquid containing hydrogen microbubbles and oxygen microbubbles provides a sterilizing and cleaning effect to remove the dirt (such oil pollution, bird excrement or leaf sap) on the solar panels 12, thereby preventing the solar panels 12 from being shaded or eroded by the dirt, and thereby enhancing the lifetime of the solar panels 12.

Figure 4:
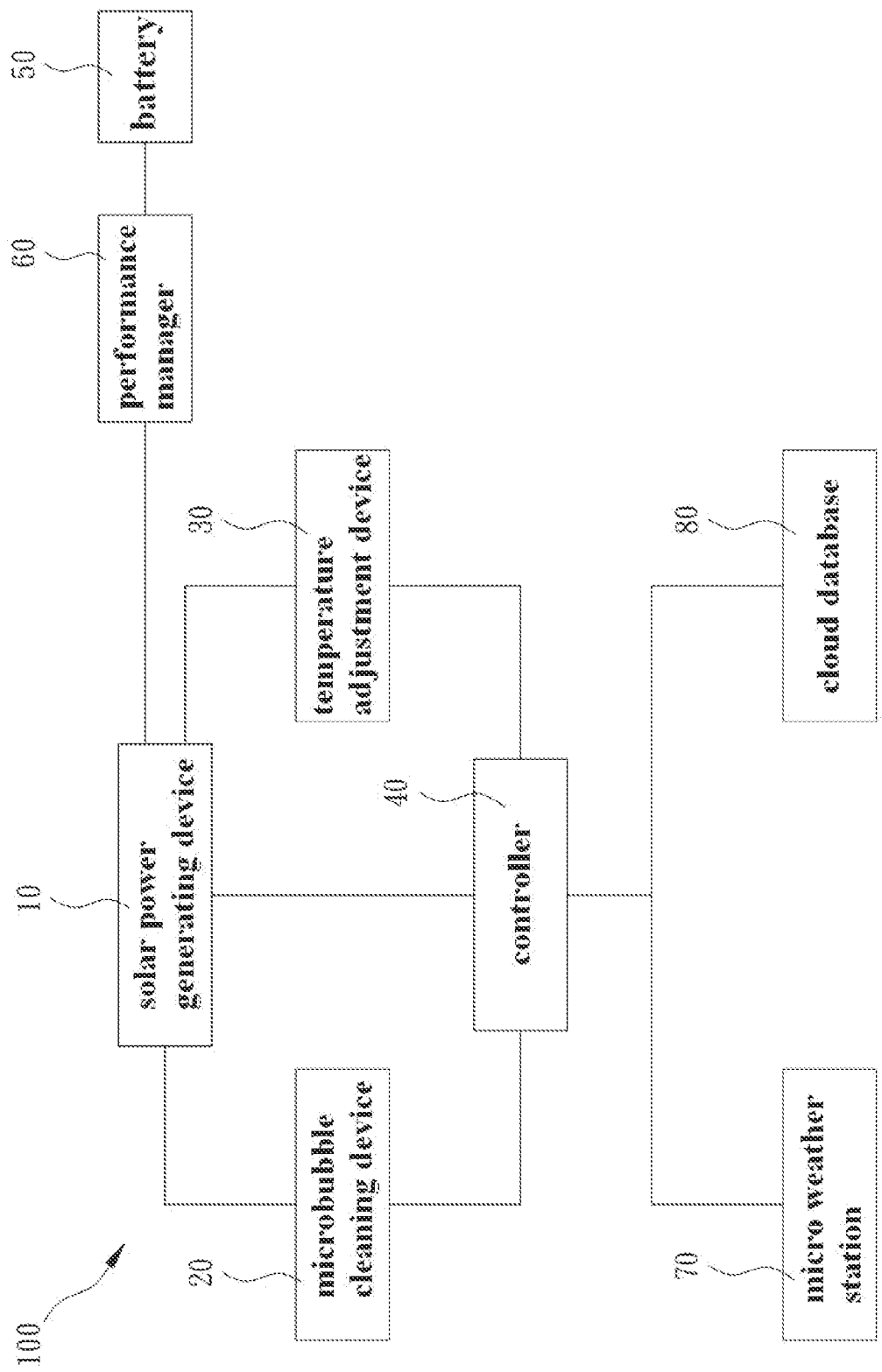
FIG. 4 is a block diagram of a solar power generating system in accordance with the second preferred embodiment of the present invention.

Referring to FIG. 4 with reference to FIGS. 1-3, the solar power generating system 100 further comprises at least one battery 50, a performance (or effectiveness or efficacy) manager 60, a micro weather station 70, and a cloud database 80. The performance manager 60 is electrically connected between the solar power generating device 10 and the at least one battery 50, to optimally manage an electric power output of the solar power generating device 10. The at least one battery 50 receives and stores the electric power output of the solar power generating device 10 through the performance manager 60. The micro weather station 70 is mounted on a periphery of the solar power generating device 10, and electrically connected with the controller 40, to detect data of ambient environment, including temperature, humidity, wind direction, wind speed, sunshine, and rainfall, and to transmit the data of ambient environment to the controller 40. The cloud database 80 is electrically connected with the controller 40, to receive and store the data of the controller 40 from the solar power generating device 10 and the micro weather station 70. Alternatively, the cloud database 80 is connected with the controller 40 in a wireless manner. A manager obtains the data from the cloud database 80 through an application (APP). The manager drives the controller through the application (APP), and controls the on/off operation of the microbubble cleaning device 20 and the temperature adjustment device 30.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A solar power generating system comprising:
a solar power generating device;
a microbubble cleaning device mounted on the solar power generating device;
a temperature adjustment device mounted on the solar power generating device; and
a controller electrically connected with the solar power generating device, the microbubble cleaning device, and the temperature adjustment device;
wherein:
the microbubble cleaning device produces a liquid containing microbubbles of a micrometer level;
the microbubble cleaning device is controlled by the controller to inject the liquid outward to clean a surface of the solar power generating device;
the temperature adjustment device is used to regulate an ambient temperature of the solar power generating device;
the controller receives data of power generation from the solar power generating device, and controls on/off operation of the microbubble cleaning device and the temperature adjustment device;
the solar power generating device includes at least one support member and multiple solar panels mounted on the at least one support member;
the solar panels collect sunlight, converts a solar power of the sunlight into an electric power by a photoelectric conversion, and outputs the electric power;
the controller is electrically connected with the solar panels;
the microbubble cleaning device is used to clean a surface of the solar panels;
the temperature adjustment device is used to regulate a temperature of the solar panels;
the microbubble cleaning device includes at least one microbubble generator, at least one cleaning pipe, and multiple cleaning nozzles;
the at least one microbubble generator supplies a liquid containing hydrogen microbubbles and oxygen microbubbles of a micrometer level to the at least one cleaning pipe;

the at least one cleaning pipe is secured to the solar power generating device and connected to the at least one microbubble generator;

the cleaning nozzles are mounted on the at least one cleaning pipe and directed toward the surface of the solar power generating device;

the temperature adjustment device includes a storage container and at least one guide pipe;

the storage container contains a cooling medium or a heating medium therein;

the at least one guide pipe is secured to the solar power generating device and connected to the storage container to circulate the cooling medium or the heating medium;

the temperature adjustment device further includes multiple spraying nozzles mounted on the at least one guide pipe and directed toward the solar power generating device; and the spraying nozzles are disposed under the solar panels.

2. The solar power generating system as claimed in claim 1, wherein the controller detects and monitors the data of power generation from the solar power generating device, including a temperature, an electric current, a voltage, and a generating power.

3. The solar power generating system as claimed in claim 2, wherein the controller presets condition parameters and identifies the data from the solar power generating device, to control the on/off operation of the microbubble cleaning device and the temperature adjustment device.

4. The solar power generating system as claimed in claim 1, wherein the controller is driven by an operator to manually control the on/off operation of the microbubble cleaning device and the temperature adjustment device.

5. The solar power generating system as claimed in claim 1, wherein the microbubble cleaning device and the temperature adjustment device are controlled by the controller and operated simultaneously.

6. The solar power generating system as claimed in claim 1, wherein:

the solar power generating system further comprises at least one battery, a performance manager, a micro weather station, and a cloud database;

the performance manager is electrically connected between the solar power generating device and the at least one battery, to optimally manage an electric power output of the solar power generating device;

the at least one battery receives and stores the electric power output of the solar power generating device through the performance manager;

the micro weather station is mounted on a periphery of the solar power generating device, and electrically connected with the controller, to detect data of ambient environment, including temperature, humidity, wind direction, wind speed, sunshine, and rainfall, and to transmit the data of ambient environment to the controller;

the cloud database is electrically connected with the controller, to receive and store the data of the controller from the solar power generating device and the micro weather station;

a manager obtains the data from the cloud database through an application (APP); and the manager drives the controller through the APP, and controls the on/off operation of the microbubble cleaning device and the temperature adjustment device.

7. The solar power generating system as claimed in claim 1, wherein the at least one guide pipe is spaced from the solar panels.

8. The solar power generating system as claimed in claim 1, wherein the at least one guide pipe is disposed under the solar panels.

9. The solar power generating system as claimed in claim 1, wherein the spraying nozzles are spaced from the solar panels.

10. The solar power generating system as claimed in claim 1, wherein the at least one guide pipe and the spraying nozzles are spaced from the at least one support member.

11. A solar power generating system comprising:

a solar power generating device;

a microbubble cleaning device mounted on the solar power generating device;

a temperature adjustment device mounted on the solar power generating device; and a controller electrically connected with the solar power generating device, the microbubble cleaning device, and the temperature adjustment device;

wherein:

the microbubble cleaning device produces a liquid containing microbubbles of a micrometer level;

the microbubble cleaning device is controlled by the controller to inject the liquid outward to clean a surface of the solar power generating device;

the temperature adjustment device is used to regulate an ambient temperature of the solar power generating device;

the controller receives data of power generation from the solar power generating device, and controls on/off operation of the microbubble cleaning device and the temperature adjustment device;

the solar power generating device includes at least one support member and multiple solar panels mounted on the at least one support member;

the solar panels collect sunlight, converts a solar power of the sunlight into an electric power by a photoelectric conversion, and outputs the electric power;

the controller is electrically connected with the solar panels;

the microbubble cleaning device is used to clean a surface of the solar panels;

the temperature adjustment device is used to regulate a temperature of the solar panels;

the microbubble cleaning device includes at least one microbubble generator, at least one cleaning pipe, and multiple cleaning nozzles;

the at least one microbubble generator supplies a liquid containing hydrogen microbubbles and oxygen microbubbles of a micrometer level to the at least one cleaning pipe;

the at least one cleaning pipe is secured to the solar power generating device and connected to the at least one microbubble generator;

the cleaning nozzles are mounted on the at least one cleaning pipe and directed toward the surface of the solar power generating device;

the temperature adjustment device includes a storage container and at least one guide pipe;

the storage container contains a cooling medium or a heating medium therein;

the at least one guide pipe is secured to the solar power generating device and connected to the storage container to circulate the cooling medium or the heating medium;

the temperature adjustment device further includes multiple spraying nozzles mounted on the at least one guide pipe and directed toward the solar power generating device; and the at least one guide pipe and the spraying nozzles are disposed under the at least one support member.

12. The solar power generating system as claimed in claim 1, wherein the at least one cleaning pipe is located outside of the solar power generating device.

13. The solar power generating system as claimed in claim 1, wherein the cleaning nozzles are located outside of the solar power generating device.

* * * * *